US008607221B1

(12) United States Patent
Donahue et al.

(10) Patent No.: US 8,607,221 B1
(45) Date of Patent: Dec. 10, 2013

(54) METHOD AND SYSTEM FOR DELIVERING PRODUCT UPDATES

(75) Inventors: Clark P. Donahue, Sunnyvale, CA (US); Vincent Parsons, San Jose, CA (US); Timothy Gladden, Livermore, CA (US)

(73) Assignee: Adobe Systems Incorporated, San Jose, CA (US)

(*) Notice: Subject to any disclaimer, the term of this patent is extended or adjusted under 35 U.S.C. 154(b) by 690 days.

(21) Appl. No.: 12/827,759

(22) Filed: Jun. 30, 2010

(51) Int. Cl.
*G06F 9/45* (2006.01)

(52) U.S. Cl.
USPC .......................................................... 717/173

(58) Field of Classification Search
USPC ................................................ 717/168–178
See application file for complete search history.

(56) References Cited

U.S. PATENT DOCUMENTS

| 7,458,021 B2* | 11/2008 | Balasubramanyan et al. ............................. 715/235 |
| 7,647,323 B2* | 1/2010 | Kasriel et al. ................. 709/224 |
| 7,676,560 B2* | 3/2010 | McCollum ..................... 709/223 |
| 2007/0169079 A1* | 7/2007 | Keller et al. ................... 717/168 |

* cited by examiner

*Primary Examiner* — John Chavis
(74) *Attorney, Agent, or Firm* — Schwegman Lundberg & Woessner P.A.

(57) ABSTRACT

A method and system for delivering product updates is provided. An example system comprises an update monitor and an update delivery manager. The update monitor may be configured to detect that a version of a product installed on a host computer is different from a latest version of the product. The an update delivery manager to obtain a manifest-specific URL template, collect product-specific information for the product installed on the host computer system, populate the manifest-specific URL template with product-specific information for the product installed on the host computer to generate a manifest-specific URL, and download, using the manifest-specific URL, a manifest that describes a sequence of steps for updating a version of the product to the latest version of the product.

20 Claims, 6 Drawing Sheets

METHOD AND SYSTEM FOR DELIVERING PRODUCT UPDATES

TECHNICAL FIELD

This application relates to the technical fields of software and/or hardware technology and, in one example embodiment, to system and method for delivering product updates to client computers.

BACKGROUND

A computing application installed on a customer's client computer may need to be periodically updated with newer versions of the application. A provider of a computing application may serve millions of customers that may run the computing application on different hardware and/or software platforms, may utilize different localized versions of the applications, as well as may run earlier-than-current versions of the application. This diversity of flavors of the computing application installed by the customers may require the ability to publish updates (or patches) that may apply either to all variants of a single product, to some subset of variants of a product, or to specific user's configuration for the same product. One approach for providing updates includes requiring that the client sends appropriate information to the server (e.g., version of the application, version of the client operating system, language, etc.) and that the server runs a Common Gateway Interface (CGI) to provide the correct update information back to the client. The use of server-side CGIs may increase the cost and limit scalability of a given installation.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

In the following detailed description, numerous specific details are set forth to provide a thorough understanding of claimed subject matter. However, it will be understood by those skilled in the art that the claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term "specific apparatus" or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, and as is apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Method and system are provided for delivering updates for products installed on client computers. The method and system use static server content and allow flexibility in delivering different content to different clients while utilizing minimal server-side intelligence and while maintaining minimum of content variations on the server. In one embodiment, a system for delivering product updates comprises executable components installed on a client computer, server-sourced executable components, declarative files describing product updates (or patches), and the patches themselves.

In one embodiment, when a product (e.g., a content processing computing application) is first installed on a host computer system (e.g., on a client computer), it is provided together with an updater module. The updater module includes a hard-coded universal resource locator (URL) template that can be used, when populated with a family identifier for the installed version of the product, to retrieve another URL template (a manifest-specific URL template) that, in turn, can be used to retrieve instructions for obtaining the latest update for the particular flavor of the product installed on the host system. The instructions for obtaining the latest update for the product may be termed a manifest. A manifest may be provided as a declarative file that describes a sequence of steps and resources that would be used to update the client's version of the installed product to the latest version of the product.

In one example embodiment, an updater system comprises two components. The first component is an updater module that is installed on the host computer system and is configured to have only basic functionality that is not likely to change often. The second component is an update delivery manager that may be maintained on a server system. The update delivery manager may be downloaded every time the updater module detects an available update for the product installed on the host computer system, which may result in making an up-to-date product updater to be available to customers without the requirement that the updater module that is installed on the host computer system is upgraded on the host computer every time changes with respect to the update process are made on the server side. The update delivery manager may be configured to determine the resources to be downloaded from the server and what steps need to be performed in order to effectuate the update, as well as perform the operations resulting in updating a version of the product installed on the host computer to the latest version of the product. In an embodiment where the update delivery manager is downloaded every time the update module detects a new update, any changes to the update delivery manager may be made by a development team without a concern that the end customers would need to be asked to update their updater module before the product update process can take place.

An example update delivery manager, once downloaded, may run on the host computer system to perform various operations that result in applying the latest update (or patch) to the installed product. As mentioned above, an update process may utilize URL templates rather than hard-coded URLs, which allows greater flexibility for the product updates provider. An example update delivery manager may be configured to obtain information that can be used to populate the URL templates and use the resulting URLs to retrieve various content that is needed in order to apply the latest patch for the installed product. Using URL templates rather than hard-coded URLs may be utilized beneficially to implement so-called back-linking. Back-linking is a process by which a update delivery manager that was downloaded to the host computer generates a list of patches that needs to be downloaded in order to bring the installed version of the product to the latest version. In one embodiment, each manifest in a chain of patches that ends with the latest patch for a product includes a version number for the patch and a URL template that can be used (when populated with specific values) to the manifest for the immediately preceding patch. Back-linking may be used beneficially in situations where the version of the installed product is different from a version immediately preceding the latest version of the product.

Figure 1:
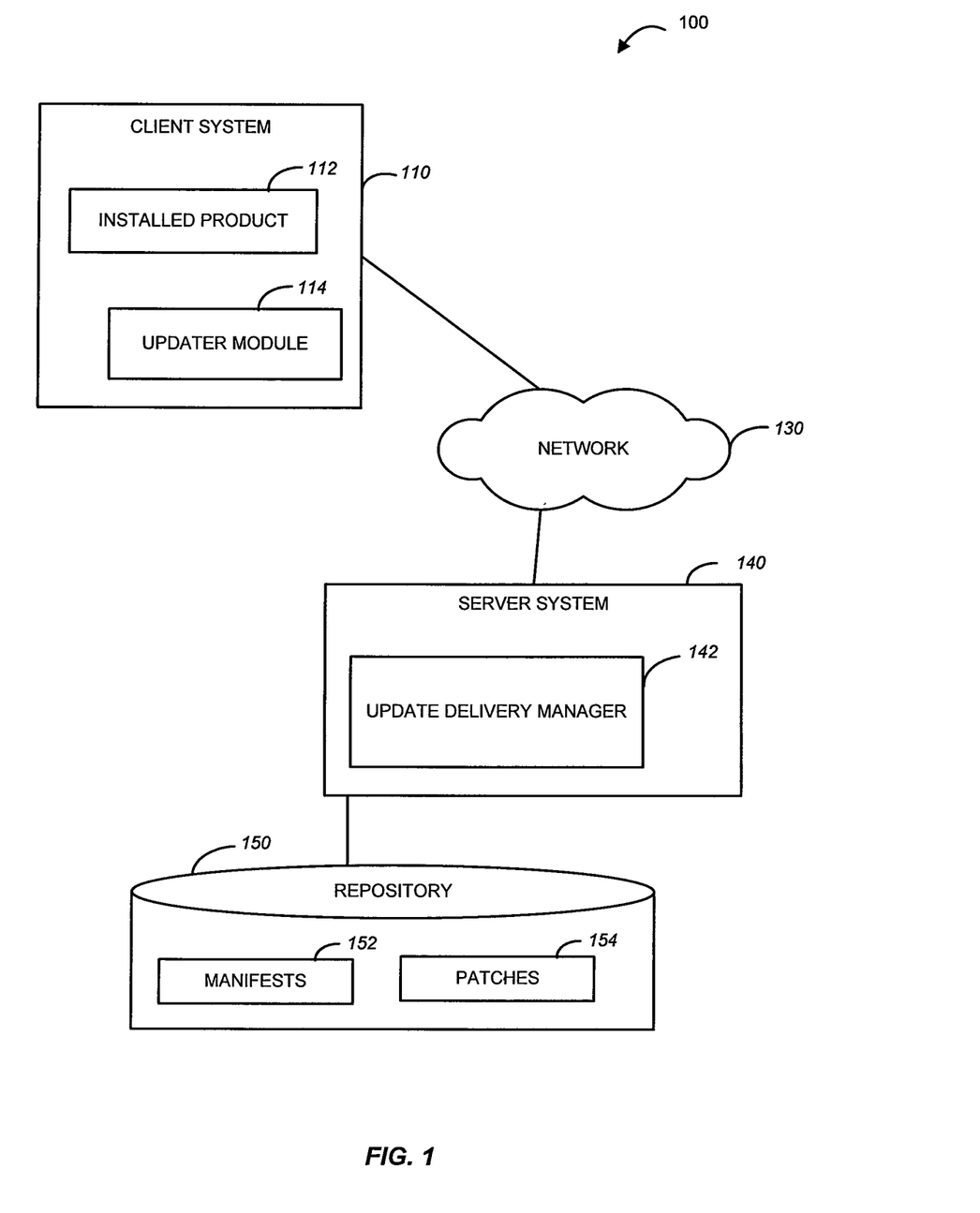
FIG. 1 is a diagrammatic representation of a network environment within which an example method and system for delivering product updates to client computers may be implemented.

An example method and system may be implemented in the context of a network environment 100 illustrated in FIG. 1. As shown in FIG. 1, the network environment 100 may include a client computer system 110 and a server computer system 140. The client system 120 hosts a computing application identified in FIG. 1 as an installed product 112 and an associated updater module 114. The installed product 112 may be a content processing application, such as, e.g., ADOBE® Reader® or ADOBE® Acrobat®. As mentioned above, the update module 114 may be installed on the client system 120 when the product 112 is first installed on the client system 120.

The client system 110 is shown as being in communication with the server system 140 via a communications network 130. The communications network 130 may be a public network (e.g., the Internet, a wireless network, etc.) or a private network (e.g., a local area network (LAN), a wide area network (WAN), Intranet, etc.). The server system 140, in one example embodiment, is configured to provide product updates (or patches) for the installed product 112. Patches 154, as well as manifests 152 may be stored in a repository 150. The server system 140 may also host an update delivery manager 142 that, together with the update module 114 may be referred to as an update system. The update delivery manager 142, in one embodiment, is downloaded to the client system 110 every time the update module 114 detects availability of a new update for the installed product 112. It will be noted, however, that, in some embodiments, the update delivery manager 142 may be installed in the client system 110 together with the update module 112. An update system, may thus be distributed among the client system 120 and the server system 140 or may be installed on the client system 120. An example update system may be described with reference to illustrated in FIG. 2.

Figure 2:
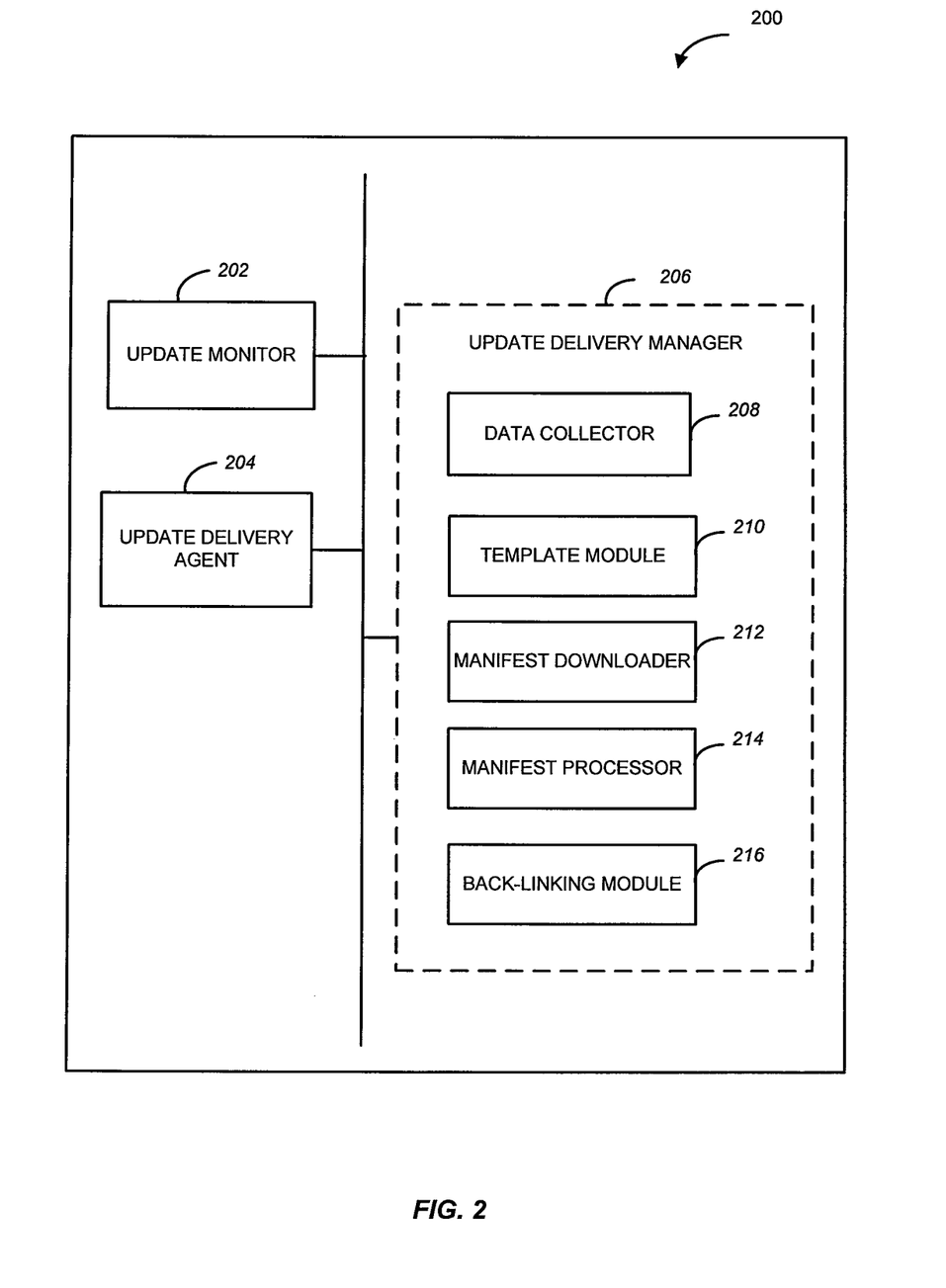
FIG. 2 is block diagram of a system for delivering product updates to client computers, in accordance with one example embodiment.

FIG. 2 is a block diagram of a system 200 for delivering product updates, in accordance with one example embodiment. As shown in FIG. 2, the system 200 includes an update monitor 202, an update delivery agent 204, and an update delivery manager 206. The update monitor 202 may be configured to detect that a version of a product installed on a host computer is different from a latest version of the product. The update delivery agent 204 may be configured to download, from the server computer system 140 of FIG. 1, the update delivery manager 206 in response to the update monitor 202 detecting that the version of the product installed on the host computer is different from the latest version of the product. The update delivery manager 206 is shown in FIG. 2 with a dotted line to indicate that it may either reside permanently on the client system 110 of FIG. 1 as part of the update system 200 or it may be downloaded to the client system 110 when the update monitor 202 detects that the version of the product installed on the host computer is different from the latest version of the product.

The update delivery manager 206, in one example embodiment, is configured to execute operations necessary for updating the installed version of the product with the latest (or later) version and may include a data collector 208, a template module 210, a downloader 212, a manifest processor 214, and a back-linking module 216. The data collector 208 may be configured to collect data about the host computer and the particular product installed on a client system. The template module 210 may be configured to access various URL templates (also referred to as (tokenized URLs) and populate tokenized URLs by replacing one or more variables present in the template with concrete values. The downloader 212 may be configured to retrieve, from the server system 140, a path file, manifests, patches, and other content that may be used in the update process. The back-linking module 216 may be configured to determine which patches need to be obtained and applied in order to update the installed version of the product to the latest version and obtain and apply those patches. An example of back-linking is discussed further below, with reference to FIG. 4.

In operation, according to one example embodiment, an update process performed by the system 200 starts with accessing a template URL that is hardcoded into the updater module 114 of FIG. 1. An example template URL that is hardcoded into the updater module 114 of FIG. 1 is shown below in Table 1, where {MAJREV} is a token (a variable) that can be populated with a concrete value of the product major revision number (a product family identifier) to produce a valid URL.

Table 1
http://ardownload.adobe.com/ARM/{MAJREV}/manifest_url_template.txt

The template URL shown in Table 1 may be hardcoded into the updater module 114 of FIG. 1 and may be referred to as a generic manifest URL template. In one embodiment, a generic manifest URL template may include one or more tokens and may point to a simple text file at a well-known location. It may consist of a series of concatenated pre-defined tokens and fixed character sequences that describe the information needed to uniquely identify the needed manifest. The tokenized string, once populated, will meet the requirements of a fully qualified URL as specified in RFC 3986. The template module 210 of the update delivery manager 206 of FIG. 2 may populate the generic manifest URL template by parsing it and substituting real values for the tokens. The token is of the form {token} to simplify the runtime identification of the token substring.

Once populated, the generic manifest URL template may be used to retrieve a path file (here, "manifest_url_template.txt") that may point to a second template URL that further describes the path to a particular resource. This mechanism assumes that all members of a major version can describe their resources in a common way. An example URL that results from populating {MAJREV} token with a product family identifier (here, a major revision "8" of the product family), is shown below in Table 2.

Table 2
http://ardownload.adobe.com/ARM/8/manifest_url_template.txt

The path file manifest_url_template.txt, in this example, includes another URL template that can be resolved into a URL suitable for retrieving a specific manifest for the particular flavor of the product that is installed on the host computer system (here, on the client 110). An example manifest-specific URL template suitable for retrieving a specific manifest for the particular flavor of the product that is installed on the host computer system is shown below in Table 3.

Table 3
http://ardownload.adobe.com/ARM/8/8.1.3Mac/{PROD}_{ARCH}.plist

As shown in Table 3, the example manifest-specific URL template has a token {PROD}_{ARCH}, describes the architecture of the product that is being updated. An example resulting manifest-specific URL where the data collector 208 of FIG. 2 determined that {PROD} and {ARCH} variables can be replaced with "AcroPro" and "univ," is shown below in Table 4.

Table 4
http://ardownload.adobe.com/ARM/8/8.1.3/Mac/AcroPro_univ.plist

The manifest-specific URL shown in Table 4 may be used to retrieve specific manifest: 8.1.3/AcroPro_univ.plist. The specific manifest may be used to download and install a patch that updates the product installed on the host system to the latest host-environment-specific version of the product.

In one example embodiment, a manifest is acquired in a secure fashion, allowing the code to validate with trust all information downloaded. This may be accomplished by connecting to the manifest server (e.g., the server system 140 of FIG. 4) through an HTTPS connection, e.g., using a standard HTTP GET or a conditional HTTP GET. The underlying security protocol may be, e.g., SSL or TLS. Example operations performed by an update system may be described with reference to FIG. 3.

Figure 3:
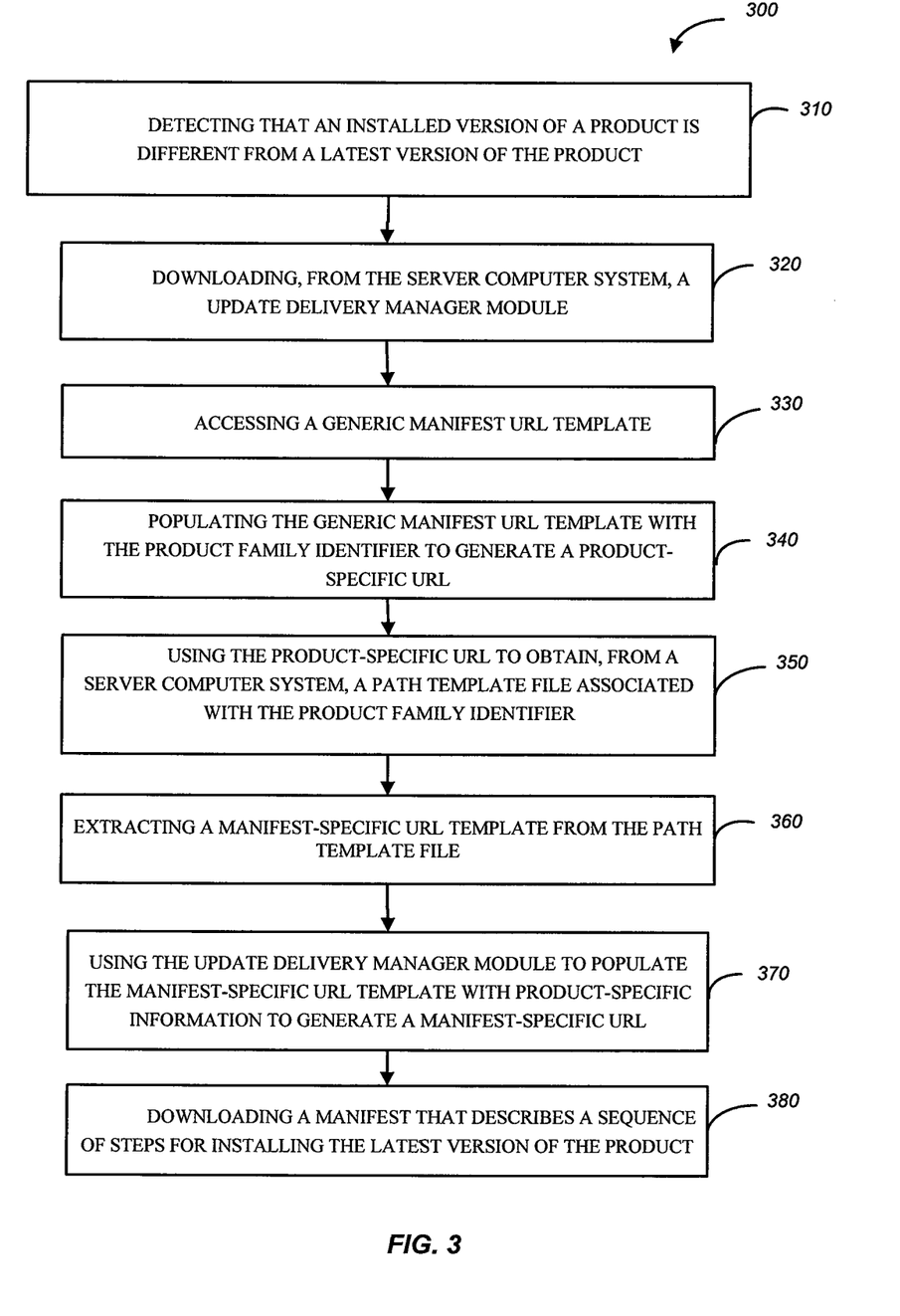
FIG. 3 is a flow chart of a method for delivering product updates to client computers, in accordance with an example embodiment.

FIG. 3 is a flow chart of a method 300 for updating a product installed on a host computer system, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the at the system 200 shown in FIG. 2.

As shown in FIG. 3, the method 300 commences at operation 310, when the update monitor 202 of FIG. 2 detects that a version of a product installed on a host computer is different from a latest version of the product. At operation 320, the update delivery agent 204 of FIG. 2 downloads, from the server computer system, the update delivery manager 206 in response to the update monitor 202 detecting that the version of the product installed on the host computer (the client system 1100f FIG. 1) is different from a latest version of the product. The template module 210 of FIG. 2 accesses a generic manifest URL template at operation 330 and populates the generic manifest URL template with a product family identifier obtained by the data collector 208 of FIG. 2 to generate a product-specific URL (operation 340). At operation 350, the manifest downloader uses the product-specific URL to obtain, from the server system 140, a path template file associated with the product family identifier. The template module 210 extracts a manifest-specific URL template from the path template file at operation 360 and populates the manifest-specific URL template with product-specific information to generate a manifest-specific URL at operation 370. At operation 380, the manifest downloader downloads a manifest that describes sequence of steps for installing the latest version of the product, using the manifest-specific URL. It will be noted that, in some embodiments, the label "product-specific" may be understood in a broad sense to describe, e.g., the type of the product installed on the host computer, the environment associated with the host computer, localization information, etc. The product-specific URL may also be used to obtain a path template file associated with that particular aspect of the product itself or of the host environment.

As mentioned above, a version of the product that is installed on the host system may be older than the latest version but not the version that immediately precedes the latest version. Manifest back-linking (or merely back-linking) is the process by which the an update delivery manager may generate a work list of patches to download in order to bring the current (installed) version of the product to the latest available version. Example back-linking operations may be described with reference to FIG. 4.

Figure 4:
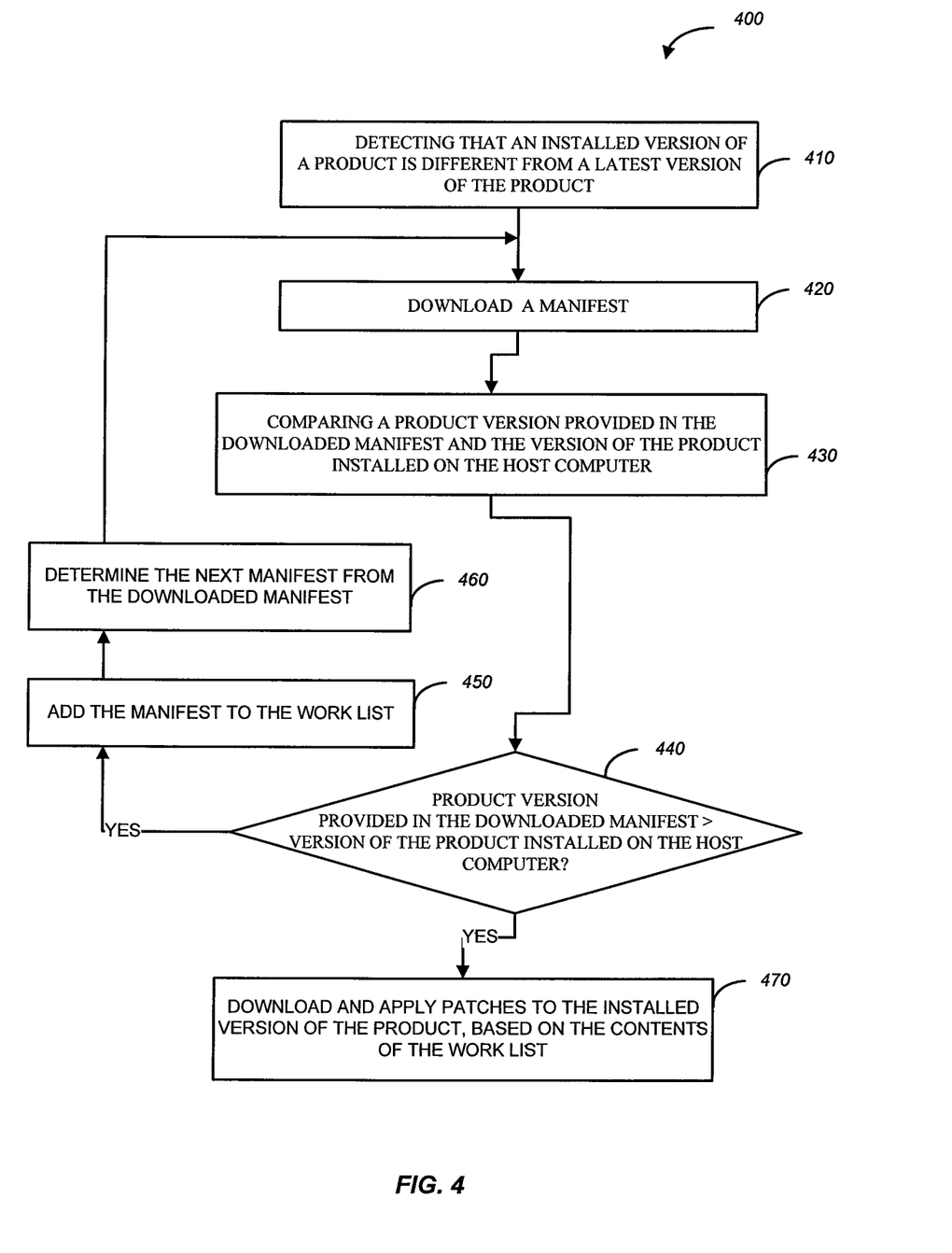
FIG. 4 is a flow chart of a method for delivering product updates to client computers utilizing back linking, in accordance with an example embodiment.

FIG. 4 is a flow chart of an example method 400 for updating a product installed on a host computer system where the product that is installed on the host system is not the version that immediately precedes the latest version of the product. The method 400 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the client system 110 of FIG. 1 and, specifically, at the system 200 shown in FIG. 2.

As shown in FIG. 4, the method 400 commences at operation 410, when the update monitor 202 of FIG. 2 detects that a version of a product installed on a host computer is different from a latest version of the product. Suppose, for example, that the product installed on a host computer is associated with data shown in Table 5 below.

TABLE 5

| | |
|---|---|
| Generic Manifest URL template | https://ardownload.adobe.com/ARM/{MAJREV}/manifest_url_template.txt |
| PROD | com_adobe_Acrobat_Pro |
| ARCH | univ |
| BuildNumber | 8.1.1 |

At operation 420, the update delivery manager 206 of FIG. 2 downloads, from the server computer system, a first manifest, by replacing the {MAJREV} token in the generic manifest URL template with the product family identifier (here it is "8" from the BuildNumber value 8.1.1). The contents of the first downloaded manifest, in this example, are shown below in Table 6.

TABLE 6

```
<!-- Template string that describes the previous patch to allow back
linking -->
    <key>PreviousURLTemplate</key>
    <string>http://ardownload.adobe.com/ARM/8/8.1.2/Mac/
{PROD}_{ARCH}.plist</string>
<!-- The target version for this manifest. Used to terminate back
linking and allows for non-sequential version numbers. It must be
monotonically increasing. -->
    <key>BuildNumber</key>
    <string>8.1.3</string>
```

As is shown in Table 6, the first manifest indicates that it is suitable to update the product to BuildNumber (version) 8.1.3 and also provides a URL template for the previous version 8.1.2. The URL template for the previous version may be referred to as a further version information, as it can be used to obtain a further manifest for the next preceding version of the product. At operation 430, the version of the product installed on the host system (here, it is 8.1.1, as is shown in Table 5) is compared to the version information provided in the downloaded manifest (here, it is 8.1.3, as is shown in Table 6). Because the version information provided in the downloaded manifest is greater than the version of the product installed on the host system (8.1.3 is greater than 8.1.1), the method 400 proceeds to operation 440, where the downloaded manifest is added to a work list. A work list is a list of zero or more manifests that are to be used for downloading and executing zero or more patches.

At operation 460, in order to determine the next manifest to be downloaded, the update delivery manager 206 accesses the URL template for the previous version (a further version information) that is present in the downloaded manifest, as shown in Table 6. The URL template for the previous version is populated and used to download a further manifest. The contents of the further manifest, in this example, are shown below in Table 7.

TABLE 7

```
<!-- Template string that describes the previous patch to allow back
linking -->
    <key>PreviousURLTemplate</key>
    <string>http://ardownload.adobe.com/ARM/8/8.1.1/Mac/
{PROD}_{ARCH}.plist</string>
<!-- The target version for this manifest. Used to terminate back
linking and allows for non-sequential version numbers. It must be
monotonically increasing. -->
    <key>BuildNumber</key>
    <string>8.1.2</string>
```

As is shown in Table 7, the further manifest indicates that it is suitable to update the product to BuildNumber (version) 8.1.2 and also provides a URL template for the previous version 8.1.1. The version of the product installed on the host system (8.1.1) is compared to the version information provided in the further manifest (here, it is 8.1.2, as is shown in Table 7). Because the version information provided in the downloaded manifest is greater than the version of the product installed on the host system (8.1.2 is greater than 8.1.1), the further manifest is also added to the work list. Next, the update delivery manager 206, once again, accesses the URL template for the previous version that is present in the further manifest, populates it and downloads a next manifest. The contents of the next manifest, in this example, are shown below in Table 8.

TABLE 8

```
<!-- Template string that describes the previous patch to allow back
linking -->
    <key>PreviousURLTemplate</key>
    <string>http://ardownload.adobe.com/ARM/8/8.1/Mac/
{PROD}_{ARCH}.plist</string>
<!-- The target version for this manifest. Used to terminate back
linking and allows for non-sequential version numbers. It must be
monotonically increasing. -->
    <key>BuildNumber</key>
    <string>8.1.1</string>
```

As is shown in Table 7, the further manifest indicates that it is suitable to update the product to BuildNumber (version) 8.1.2 and also provides a URL template for the previous version 8.1.1. The version of the product installed on the host system (8.1.1) is compared to the version information provided in the further manifest (here, it is 8.1.1, as is shown in Table 7). Because the version information provided in the downloaded manifest is not greater than the version of the product installed on the host system (8.1.1 is not greater than 8.1.1), the next manifest is not added to a work list. Instead, the method 400 proceeds to operation 470, where patches associated with the first manifest and the further manifest listed in the work list are downloaded and applied.

An approach where a URL template is utilized in order to easily apply various flavors and versions of patches to a product installed on a host system may be utilized beneficially is other contexts that may not be related to updates. For example, a request may be issued by a client computer system to deliver/obtain a video content suitable for certain video-rendering computing application running on the client computer. In order to process this request, the client may first access a template URL and then populate one or more tokens present in the URL with client-platform-specific values. The resulting URI may be then used to retrieve the video content suitable for running on the client computer system.

The example of a URL template for delivering Flash® video to machines that support Flash®, ".mov" files to Macs® and ".wmv" files to Windows® is shown below in Table 9.

Table 9 http://example.com/media/{HAS_FLASH}_{PLATFORM}/data

The example of a populated URL template for delivering a ".mov" file to a Mac® is shown below in Table 10.

Table 10 http://example.com/media/YES_MAC/data

Figure 5:
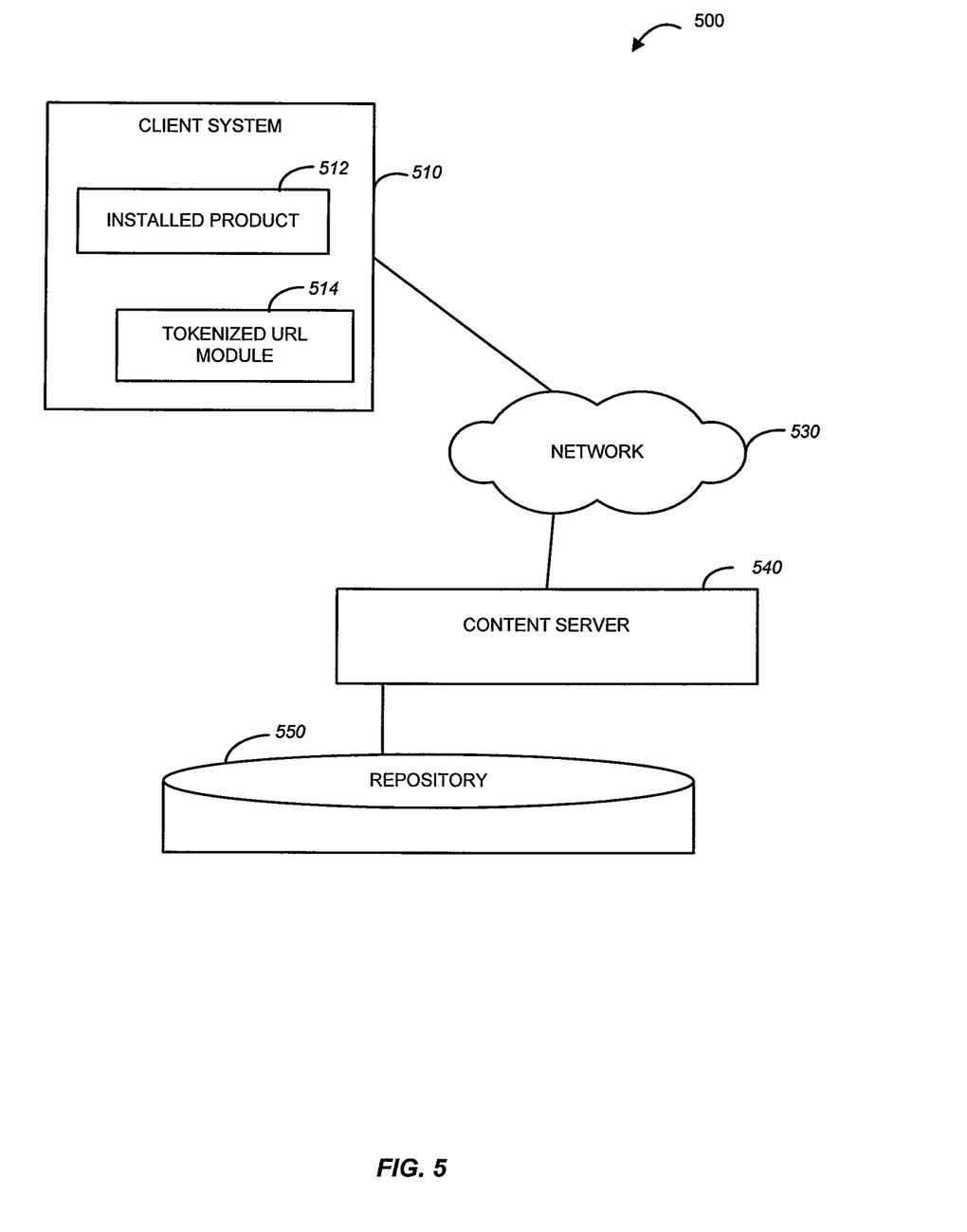
FIG. 5 is a diagrammatic representation of a network environment within which an example tokenized URL module may be utilized.

Another example URL template may be provided that may be used to deliver Flash® video to machines that support Flash® and h.264 files to all platforms without Flash®. An example of such URL template is shown below in Table 11.
Table 11
http://example.com/media/{HAS_FLASH}/data Tokenized URLs (also referred to as URL templates) may be used in the context of a network environment 500 illustrated in FIG. 5. As shown in FIG. 5, the network environment 500 may include a client computer system 510 and a content server 540. The client system 520 hosts a computing application identified in FIG. 5 as an installed product 512. The client system 520 also hosts a tokenized URL module 514. The installed product 512 may be suitable for rendering video content, e.g., a Flash® player, a Windows® player, etc. The client system 110 is shown as being in communication with the server system 140 via a communications network 130. The tokenized URL module 514 may be configured to access and populate a URL template that can be used for obtaining video content suitable for processing by the installed product 512, as explained above with reference to Tables 9-11. Video content may be stored in a repository 550.

Figure 6:
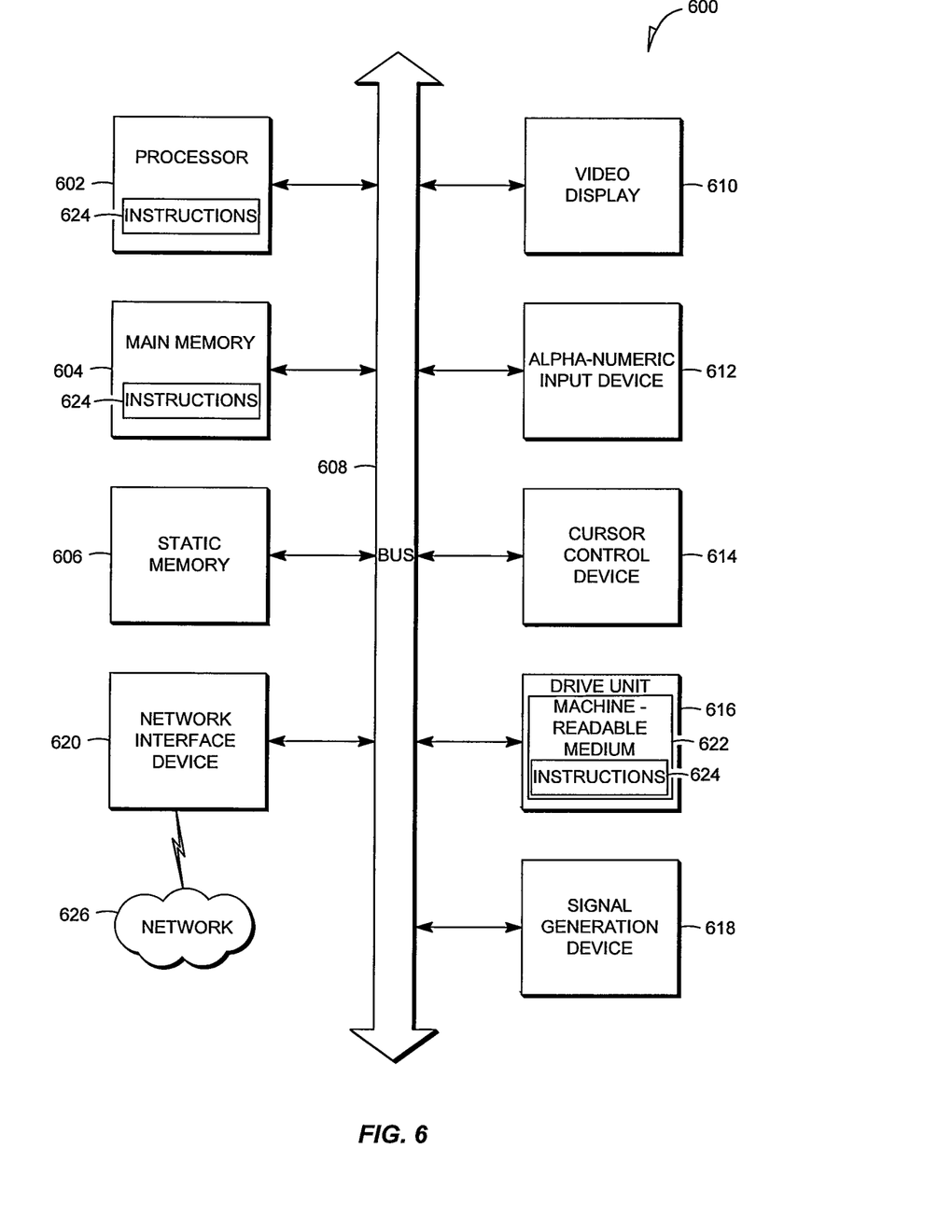
FIG. 6 is a diagrammatic representation of an example machine in the form of a computer system within which a set of instructions, for causing the machine to perform any one or more of the methodologies discussed herein, may be executed.

FIG. 6 shows a diagrammatic representation of a machine in the example form of a computer system 600 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alpha-numeric input device 612 (e.g., a keyboard), a user interface (UI) navigation device 614 (e.g., a cursor control device), a disk drive unit 616, a signal generation device 618 (e.g., a speaker) and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, with the main memory 604 and the processor 602 also constituting machine-readable media.

The software 624 may further be transmitted or received over a network 626 via the network interface device 620 utilizing any one of a number of well-known transfer protocols (e.g., Hyper Text Transfer Protocol (HTTP)).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Thus, a method and system for delivering product updates to a client computer system has been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A method comprising:
   detecting that a version of a product installed on a host computer is different from a latest version of the product;
   obtaining, from a server, a manifest-specific URL template for the product, the manifest-specific URL template including one or more variables;
   collecting product-specific information for the product installed on the host computer system;
   populating the variables of the manifest-specific URL template with product-specific information for the product installed on the host computer to generate a manifest-specific URL; and
   downloading, from the server, using the populated manifest-specific URL, a manifest specific for the product installed on the host computer out of a plurality of manifests stored on the server for the product, the manifest specific for the product describing a sequence of steps for updating the product installed on the host computer to the latest version of the product.

2. The method of claim 1, comprising:
   accessing a generic manifest URL template;
   accessing a product family identifier for the product; and
   populating the generic manifest UPL template with the product family identifier to generate a product-specific URL, wherein the obtaining of the manifest-specific URL template comprises using the product-specific URL.

3. The method of claim 2, wherein the accessing of the product family identifier comprises accessing the product family identifier stored on the host computer.

4. The method of claim 2, wherein the accessing of the generic manifest URL template comprises accessing of the generic manifest URL template stored on the host computer.

5. The method of claim 1, comprising downloading, from the server computer system, an update delivery manager module in response to the detecting, wherein the obtaining of the manifest-specific URL template, the collecting product-specific information, and the populating of the variables manifest-specific URL template with product-specific information are performed using the update delivery manager module.

6. The method of claim 1, updating the product installed on the host computer to the latest version of the product, using the downloaded manifest.

7. The method of claim 1, wherein the product-specific information for the product installed on the host computer system comprises one or more of product name, host operating system, host hardware platform, and localization information.

8. The method of claim 1, comprising:
accessing a downloaded version information provided in the downloaded manifest;
comparing the downloaded version information and the version of the product installed on the host computer;
determining that the downloaded version information is greater than the version of the product installed on the host computer; and
adding the downloaded manifest to a list of manifests, the list of manifests comprising one or more manifests designated for execution on the host computer.

9. The method of claim 8, comprising:
downloading a further manifest;
accessing a further version information provided in the further manifest;
comparing the further version information and the version of the product installed on the host computer;
determining that the further version information is not greater than the version of the product installed on the host computer;
identifying the list of manifests as a complete list of manifests; and
executing manifests from the complete list of manifests.

10. The method of claim 9, wherein the downloading of the further manifest comprises:
accessing a further manifest URL template provided in the manifest;
populating variables of the further manifest URL template with the product-specific information to determine a further manifest URL, the further manifest URL that describes a sequence of steps for retrieving the further manifest.

11. A computer-implemented system comprising:
an update monitor to detect that a version of a product installed on a host computer is different from a latest version of the product; and
an update delivery manager, implemented by at least one processor configured to:
obtain, from a server, a manifest-specific URL template, the manifest-specific URL template including one or more variables,
collect product-specific information for the product installed on the host computer system,
populate the variable of the manifest-specific URL template with product-specific information for the product installed on the host computer to generate a manifest-specific URL, and
download, from the server using the manifest-specific URL, a manifest specific for the product installed on the host computer out of a plurality of manifests stored on the server for the product, the manifest specific for the product describing a sequence of steps for updating the product installed on the host computer to the latest version of the product.

12. The system of claim 11, wherein the update delivery manager is to:
access a generic manifest URL template;
access a product family identifier for the product; and
populate the variables of the generic manifest URL, template with the product family identifier to generate a product-specific URL, wherein the obtaining of the manifest-specific URL template comprises using the product-specific URL.

13. The system of claim 12, wherein the update delivery manager is to access the generic manifest URL template stored on the host computer.

14. The system of claim 11, comprising an update delivery agent to download, from the server computer system, the update delivery manager module in response to the update monitor detecting that the version of the product installed on the host computer is different from the latest version of the product.

15. The system of claim 11, wherein the update delivery manager is to update the product installed on the host computer to the latest version of the product, using the downloaded manifest.

16. The system of claim 11, wherein the product-specific information for the product installed on the host computer system comprises one or more of product name, host operating system, host hardware platform, and localization information.

17. The system of claim 11, wherein the update delivery manager is to:
access a downloaded version information provided in the downloaded manifest;
compare the downloaded version information and the version of the product installed on the host computer;
determine that the downloaded version information is greater than the version of the product installed on the host computer; and
add the downloaded manifest to a list of manifests, the list of manifests comprising one or more manifests designated for execution on the host computer.

18. The system of claim 17, wherein the update delivery manager is to:
download a further manifest;
access a further version information provided in the further manifest;
compare the further version information and the version of the product installed on the host computer;
determine that the further version information is not greater than the version of the product installed on the host computer;
identify the list of manifests as a complete list of manifests; and
execute manifests from the complete list of manifests.

19. The system of claim wherein the update delivery manager is to:
access a further manifest URL template provided in the further manifest;
populate variables of the further manifest UPL template with the product-specific information to determine a further manifest URL, the further manifest URL that describes a sequence of steps for retrieving the further manifest.

20. A non-transitory machine-readable storage medium having instruction data to cause a machine to:
- detect that a version of a product installed on a host computer is different from a latest version of the product;
- obtain, from a server, a manifest-specific URL template, the manifests specific URL template including one or more variables;
- collect product-specific information for the product installed on the host computer system;
- populate the variables of the manifest-specific URL template with product-specific information for the product installed on the host computer to generate a manifest-specific URL; and
- download, from the server, using the manifest-specific URL, a manifest specific for the product installed on the host computer out of plurality of manifests stored on the server for the product, the manifest specific for the product describing a sequence of steps for updating the product installed on the host computer to the latest version of the product.

* * * * *